No. 751,650. PATENTED FEB. 9, 1904.
C. F. JEWETT.
JACKET FOR AUTOMOBILE STEAM BOILERS.
APPLICATION FILED FEB. 6, 1903.
NO MODEL. 2 SHEETS—SHEET 1.
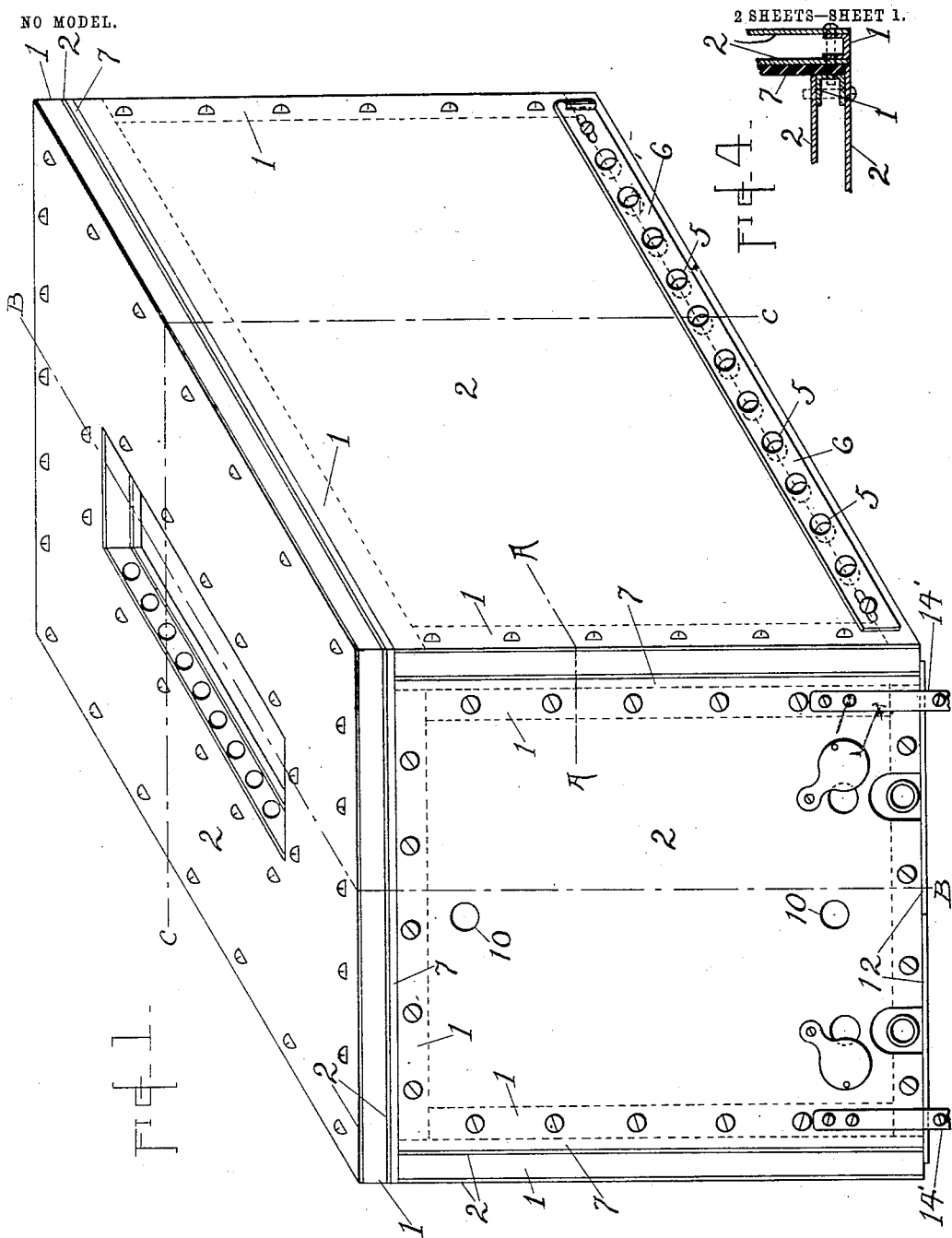
WITNESSES:
INVENTOR
Clarence F. Jewett
BY
ATTORNEYS No. 751,650. PATENTED FEB. 2, 1904.
C. F. JEWETT.
JACKET FOR AUTOMOBILE STEAM BOILERS.
APPLICATION FILED FEB. 6, 1903.
NO MODEL. 2 SHEETS—SHEET 2.
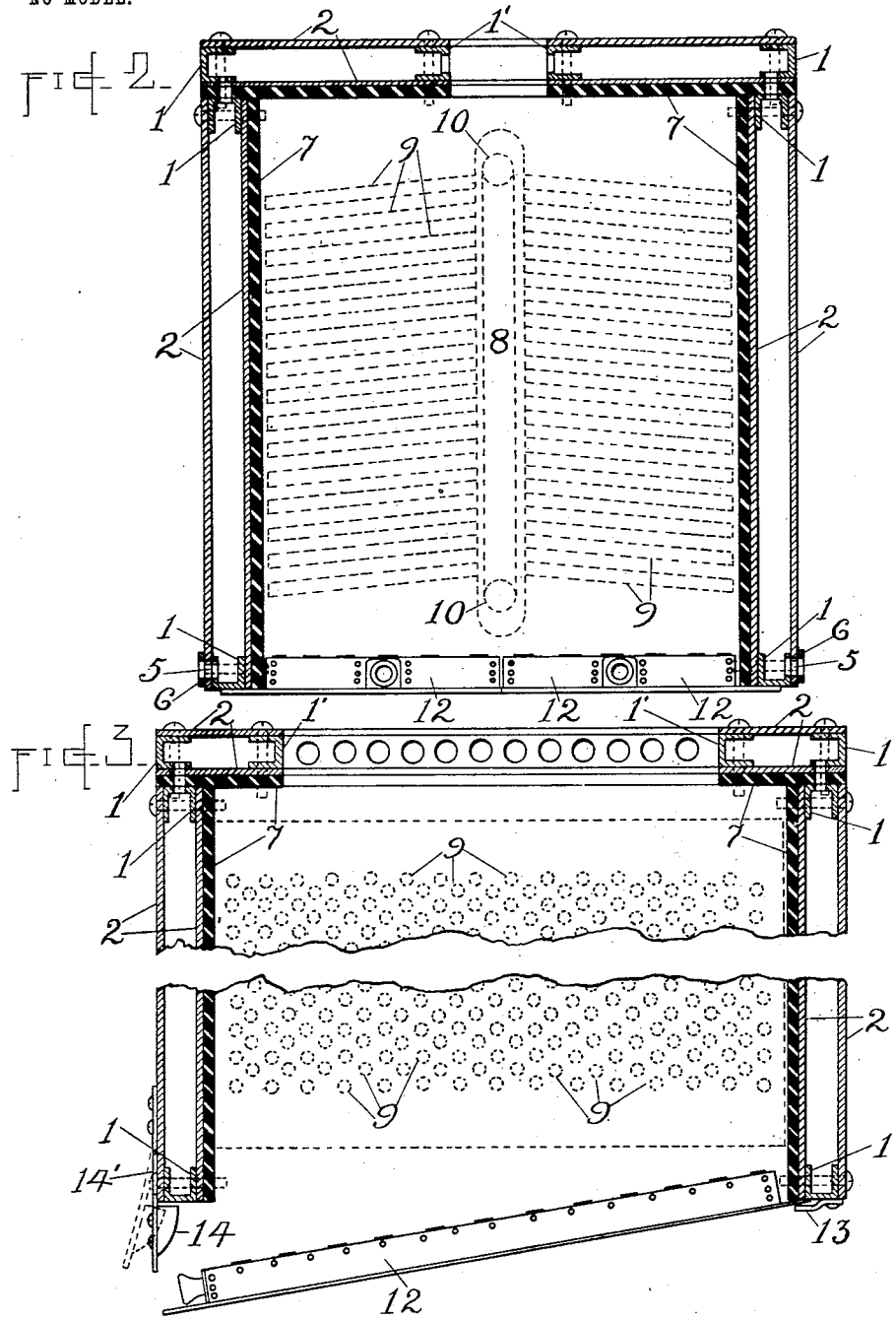
WITNESSES:
INVENTOR
Clarence F Jewett
BY
ATTORNEYS No. 751,650. Patented February 9, 1904.

UNITED STATES PATENT OFFICE.

CLARENCE F. JEWETT, OF NEW YORK, N. Y.

JACKET FOR AUTOMOBILE STEAM-BOILERS.

SPECIFICATION forming part of Letters Patent No. 751,650, dated February 9, 1904.

Application filed February 6, 1903. Serial No. 142,110. (No model.)

*To all whom it may concern:*

Be it known that I, CLARENCE F. JEWETT, a citizen of the United States, and a resident of New York city, in the county of New York and State of New York, have invented certain new and useful Improvements in Jackets for Automobile Steam-Boilers, of which the following is a specification.

My invention relates to jackets or casings for steam-boilers, but more particularly to casings for steam-boilers employed on automobiles, where, as is well known, the heat of the boiler, especially in warm weather, is a source of great annoyance and frequently of danger to neighboring persons and objects. During cold weather, at which time it is necessary to preserve the heating capacity of the boiler as much as possible, it is desirable to prevent the radiation of heat as much as possible; but the devices which would be most effective as a protective device in warm weather would in cold weather be wasteful of heat at the time when it is most necessary to conserve it.

The object of my invention is to provide a casing which shall act to thoroughly cut off the heat from surrounding objects during warm weather and which at the same time shall be capable of adjustment or regulation, so that its heat-insulating or heat-dispensing effects shall be cut down during cold weather, at which time it is necessary to conserve all the heat generated for heating the boiler.

To these ends my invention consists in the combination, with the boiler, of a hollow casing or air-jacket, a suitable damper for permitting air to circulate in greater or less degree or not at all, according to the various states of the weather, and means for directing or conveying the heated air into a chimney or draft-flue through which the products of combustion escape.

The invention consists also in special devices for supporting the burner in such a way as to permit the same to be readily detached and in other details of construction and combinations of parts hereinafter more particularly described, and specified in the claims.

In the accompanying drawings, Figure 1 is a view of a boiler-casing constructed in one of the ways by which it may be adapted to serve the purposes of my invention. Fig. 2 is a transverse vertical section, on a slightly enlarged scale, taken on the line C C, Fig. 1, the burner being shown in full. Fig. 3 is a longitudinal vertical section, on a slightly enlarged scale, taken on the line B B, Fig. 1. Fig. 4 is a horizontal section taken at A A, Fig. 1, of one of the corners of the casing, showing the manner of joining the frames forming the sides.

In constructing the casing I prefer to use a frame of channel-iron, to which are suitably bolted or riveted plates of sheet-iron held apart by the structure of the frame to provide a casing whose walls are hollow, so as to permit the circulation of a current of air or to hold a body of dead air, forming in either case a heat-insulating jacket for the boiler.

1 indicates bars of channel-iron suitably bolted or secured together to form a frame, which may be filled in on its sides and ends and on its top to form a casing for the boiler. On the top side of said casing there is provided at or about the center a rectangular frame 1', coinciding with the usual draft-flue, which may set over the same in any desired manner.

2 indicates in all cases plates of sheet-iron or other suitable material, riveted or secured to the channel-bars in the manner clearly shown in the drawings. Those plates which form the top of the casing are suitably cut away to coincide with the rectangular frame 1'; but openings are formed in said frame, thus providing means whereby air passing around the sides of the hollow casing and into the hollow top may escape into the draft-flue and may pass away with the products of combustion through the usual chimney. At the upper edge or corner of the channel-iron frame there are provided, preferably, two channel-irons around the whole edge, which are bolted together, with the base of the channel-iron beneath presented to the side of the channel-iron above, and preferably with the plates 2, constituting the inside wall of the hollow top, secured between them. The base of the channel-irons, at the upper edge, forms a wall which closes in the edge of the space included between the horizontal plates 2. Suitable openings are formed in the channel-irons and through the plates 2 to allow the air to pass from the hollow space between the side walls of the casing to the hollow space in the top of the casing, from which it escapes, as just described, when the circulation of air is permitted. Air enters the hollow side walls through openings 5, near the bottom thereof. These openings may be closed partially or completely by the damper-plates 6, adjustable, preferably, by mounting them so as to be capable of sliding on pins or guides in the manner clearly shown. To assist in the insulation of the heat of a boiler, sheets of asbestos 7 may be interposed between the boiler and the sheet-iron plates 2, forming the inner walls of the air-casing. The boiler may be of any desired form, but is here shown as of the type in which there is a central body 8 of cast copper, from which extend the steel tubes 9, having their outer ends closed and square and connected to the copper body by a screw connection. This boiler may be supported in the casing in any desired manner by the pipes 10, which form the water-supply and steam pipes and which extend through vertical walls of the jacket or casing and are sustained thereby. As will be obvious, however, my invention does not depend upon the manner of supporting the boiler and is obviously capable with other forms of boiler besides the one shown.

The burners, of which one or more may be employed, although two are shown, consist, as indicated at 12, of plate-burners of the usual type. These plate-burners are supported at one end, as shown in Fig. 3, by a hook or rest 13, from which they may be disengaged by an endwise movement when the opposite end is permitted to swing down, while at said opposite end they are supported by adjustable latches or hooks bolted or riveted to the front wall of the casing. These may consist of stops or hooks 14, secured to rather stiff plate-springs 14', or may be otherwise constructed.

In the use of this casing during warm weather the dampers 6 are opened wide to allow free circulation of air through the side walls and top of the casing and out by the draft-flue. These air-currents carry off the superfluous heat and protect neighboring persons or objects from the heat of the burners and boiler. In cooler weather the dampers may be closed partially to lessen the circulation and in very cold weather they may be closed entirely, thus establishing a casing of dead air and lessening the withdrawal of heat through the draft-flue, so that the heat of the boiler may be more perfectly retained by the casing and the steaming capacity fully preserved. In extremely warm weather this dead-air jacket would not, however, thoroughly cut off the radiation of heat through the walls, and the heat effect may with higher atmospheric temperatures become disagreeable or even dangerous. For this reason I provide the means for establishing a circulation of air through the jacket, as already described, and which may be caused to flow at will and in greater or less amount, as required, by adjusting the dampers 6.

What I claim as my invention is—

1. The combination with an automobile steam-boiler, of a hollow jacket therefor connected on the one hand with a draft-flue and on the other with passages or openings in communication with the external atmosphere, of means for regulating the flow of air through said jacket or casing and into the draft-flue, as and for the purpose described.

2. The combination with an automobile steam-boiler, of an air-jacket communicating with the draft-flue and a damper for regulating circulation of air through said jacket.

3. The combination with the boiler and a channel-iron frame to which sheet-iron is bolted to form hollow side walls, of a channel-iron frame forming the opening for the draft-flue and having plates of metal bolted to it and to the channel-irons at the edge of the casing to form a hollow top for the jacket.

4. The combination with the boiler and a channel-iron frame surrounding the same and having plates of suitable material bolted or secured to it to form hollow side walls, of a hollow top wall or roof consisting of channel-iron to which plates are secured at their exterior edges and around a central opening coinciding with the draft-flue.

5. The combination with the boiler, of a channel-iron frame and plates of suitable material secured thereto, to form a hollow casing embracing the sides and top of the boiler, and openings through the channel-iron frame to establish communication between the hollow side walls and the hollow top, and between the top and the draft-flue.

6. The combination with a steam-boiler and the air casing or jacket having openings by which the air passing through the side walls and top may escape, of one or more dampers or valves at or near the bottom of side walls for regulating the ingress of air.

7. The combination with a boiler, of a casing or jacket therefor communicating with the draft-flue and comprising a channel-iron frame and plates secured thereto to form hollow walls, of a slide valve or valves 6 controlling the openings by which air is admitted to the side walls.

Signed at New York city, in the county of New York and State of New York, this 28th day of January, 1903.

CLARENCE F. JEWETT.

Witnesses:
J. GALLWITZ,
E. L. LAWLER.